United States Patent
Polyakov

(10) Patent No.: US 9,529,930 B2
(45) Date of Patent: Dec. 27, 2016

(54) UNIFIED ID

(71) Applicant: Delonaco Limited, Nicosia (CY)

(72) Inventor: Maxym Polyakov, Menlo Park, CA (US)

(73) Assignee: Delonaco Limited, Nicosia (CY)

(*) Notice: Subject to any disclaimer, the term of this patent is extended or adjusted under 35 U.S.C. 154(b) by 0 days.

(21) Appl. No.: 14/300,065

(22) Filed: Jun. 9, 2014

(65) Prior Publication Data

US 2015/0356315 A1 Dec. 10, 2015

(51) Int. Cl.
G06F 21/30 (2013.01)
G06F 17/30 (2006.01)
G06F 21/41 (2013.01)

(52) U.S. Cl.
CPC ......... *G06F 17/30893* (2013.01); *G06F 21/41* (2013.01); *G06F 2221/2145* (2013.01)

(58) Field of Classification Search
CPC .............................. H04L 63/10; H04L 63/102
See application file for complete search history.

(56) References Cited

U.S. PATENT DOCUMENTS

2008/0015878 A1* 1/2008 Feng ...................... G06Q 30/02
705/1.1

* cited by examiner

*Primary Examiner* — Izunna Okeke
(74) *Attorney, Agent, or Firm* — Sheppard, Mullin, Richter & Hampton LLP

(57) ABSTRACT

A unified ID system implementing a "single point" account in the Internet to allow a user to enter, aggregate, manage and control personal data is disclosed.

10 Claims, 3 Drawing Sheets

UNIFIED ID

TECHNICAL FIELD

The present invention is directed to a user's management of the user's own online data.

DETAILED DESCRIPTION

Figure 1:
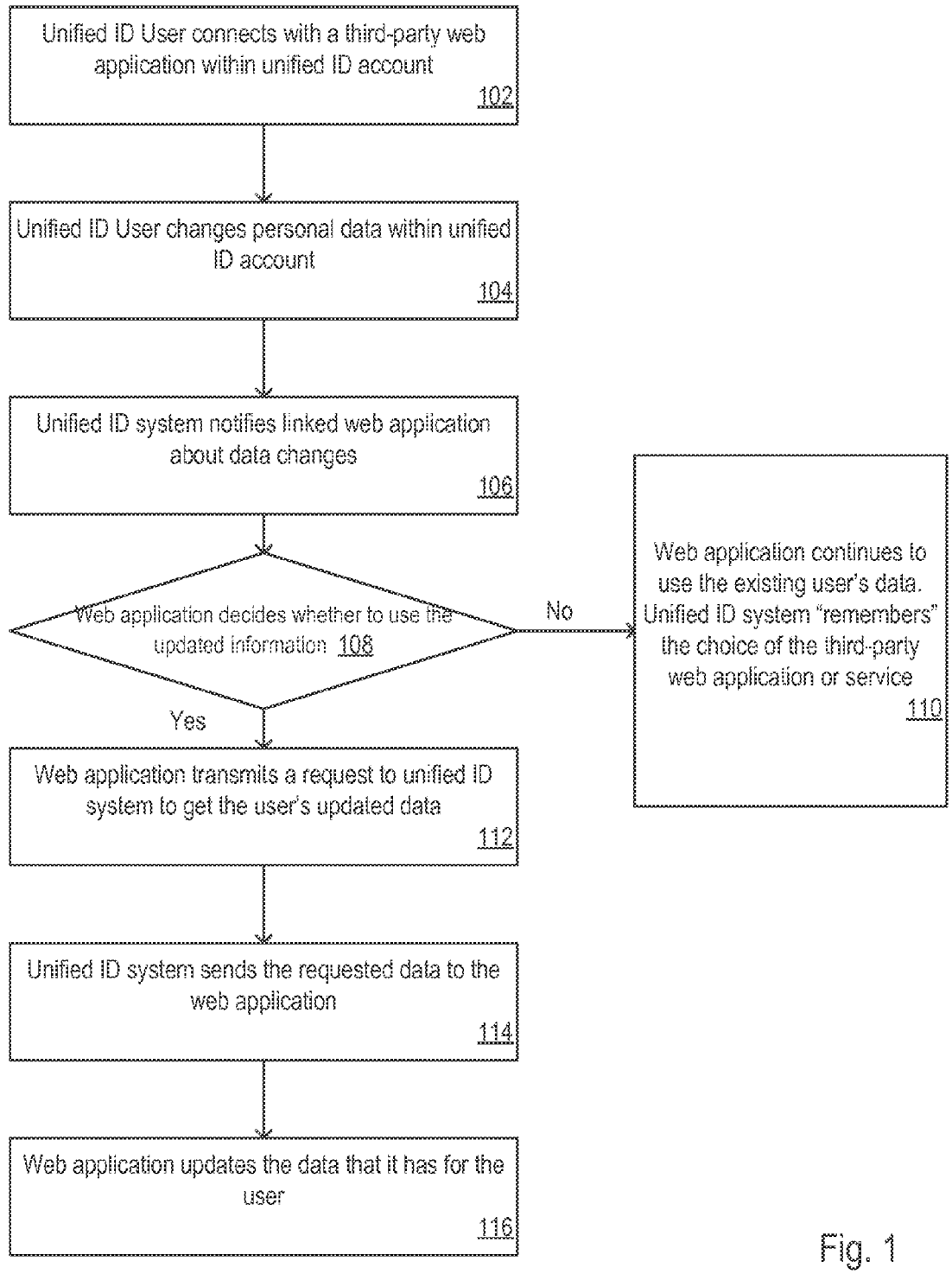
FIG. 1 is a high-level flow chart that illustrates data actualization using a unified ID system, according to certain embodiments.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a system and platform (herein referred to as the unified ID system) is provided to enable a user to manage the user's online data. Non-limiting examples include providing the user with a single gateway to the internet such that the user need only manage one account and the user's data in that account. According to certain embodiments, the single gateway will automatically propagate and/or update the user's data in the user's other online accounts. According to certain embodiments, the unified ID system obtains permission from the user before updating the user's other online accounts. The user may select those of her online accounts for which she wishes to receive the updates, according to certain embodiments. While the user would like to enjoy service and product personalization and customization by providing her personal data, the user is often burdened with having to undergo an interminable number of online registrations and then having to perform the tedious task of populating the respective accounts with her personal data. As a non-limiting example, if the user has changes to her martial status, or changes her residence or employment, has a new family or new hobbies, or new interests, etc., then the unified ID system can save time for the user by automatically updating the user's data in all the service accounts selected for update by the user. The benefit to the user is that the updated service accounts can start applying the user's updated data to provide the user with a better or more relevant user experience and better services based on the user's updated data. According to certain embodiments, the user need only enter/update her data in the unified ID system and the user's data will be automatically propagated to any services, social networks, applications or forums etc., that are linked to the unified ID system. The unified ID system also provides the user a convenient way of controlling the user's data. Moreover, the unified ID system, by having the most comprehensive collection of the user's data, can enable the other services that are linked to the unified ID system to provide the most relevant user experience to the user based on such comprehensive data.

According to certain embodiments, such a unified ID system ensures that the user has access to the most innovative and high-end internet services and products because the unified ID system is a leading edge tool for personal data management.

According to certain embodiments, the unified ID system has at least a subset of the following features:

1. The unified ID system: (a) enables the user to conveniently and effectively control the user's personal data at a single point on the Internet; (b) is a tool that can automatically update the user's personal data in service accounts that are linked to the unified ID system; (c) is a tool that enables the user to select data for propagating to the third party service accounts, websites, applications that are providing services or products to the user.
2. Websites, applications and/or service accounts associated with the user: (a) can develop and implement third party services authorization/authentication tools using the unified ID system; (b) can obtain up-to-date personal information on respective users via the unified ID system.
3. The unified ID system can revolutionize the current internet model by enabling online service providers and e-commerce businesses to provide high-end products and services to the user rather than merely hoarding data and thus can add value to the internet environment.

According to certain embodiments, the unified ID system is a "single point" account in the Internet that allows a user to enter, aggregate, manage and control personal data. Such a single point account allows the aggregation of a user's information in one convenient place and thus avoids inconsistencies of the user's data that exists in various places on the internet and also avoids an inaccurate and/or incomplete portrait of the user.

The user can use the unified ID system to tightly control her personal data that is to be propagated to various service accounts and internet websites and applications. Further, by using the unified ID system, the user has a clearer view of the volume, placement and nature of the information that the user is making available over the internet at any given time.

According to certain embodiments, in the event that the user's data is updated at a service account or application that is linked to the unified ID system, the unified ID system notifies the user of the data update in order to: (a) confirm with the user that the data updates are not made by mistake or by a fraudster; (b) to allow the user to apply the updates conveniently to the data in the user's other linked accounts and the unified ID account, if needed; (c) in the case of inconsistencies between the user's data in the linked accounts and that of the unified ID system, the unified ID system will notify the user of the inconsistencies so that the user can take corrective action.

The manner in which the unified ID system allows the user to conveniently propagate and/or update the user's personal information over a multiplicity of places in the Internet (as selected by the user, for example) is herein referred to as "data actualization."

FIG. 1 is a high-level flow chart that illustrates data actualization using a unified ID system, according to certain embodiments. At block 102 of FIG. 1, the user connects with or links to a third party web application or service through the user's unified ID account. At block 104, the user makes a change to her personal data using the unified ID system. At block 106, the unified ID system notifies the linked third party web application of the user's data changes (updated data). At block 108, the third party web application decides whether to use the updated data. If the third party web application decides not to use the updated data, then at block 110, the third party web application continues to use the user's data that the web application currently has and the unified ID system remembers that this particular third party web application's preference not to accept updated data. If the third party web application decides to accept the updated data, then at block 112, the third party web application sends a request to the unified ID system to transmit the user's updated data. At block 114, the unified ID system sends the requested updated data to the third party web application. At block 116, the third party web application updates the user's data that is stored by the third party web application. Thus, the web applications and web services can benefit by using the most up-to-date relevant information on the user in order to provide customized services to the user. By providing good services to the user, the web services and web applications are less likely to lose the user as a customer. Further, if the web services and web applications used outdated information on the user such as an outdated email address, the email campaign and marketing efforts of the web services will not reach the user.

According to certain embodiments, a user has the ability to stop sending updated information to any third party web application or service by using the unified ID system. Further, the user can also delete all her information that is stored at any given third party web application or service by using the unified ID system.

Figure 2:
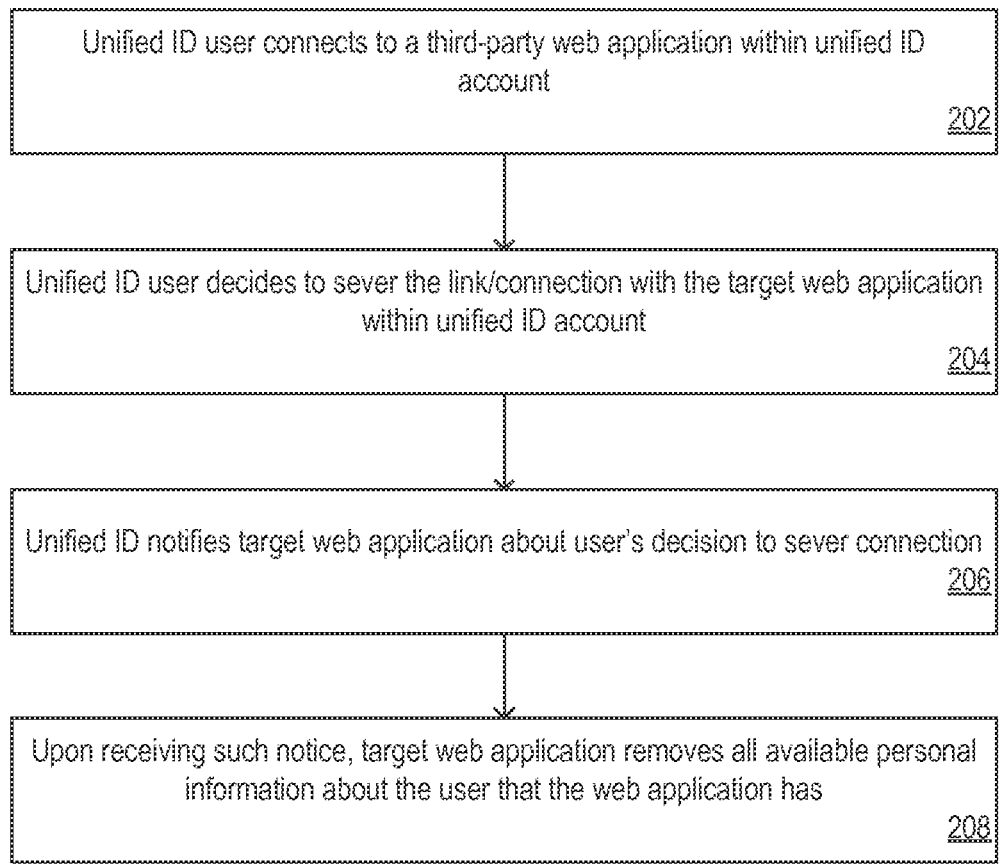
FIG. 2 is high-level flow chart that illustrates management of the user's data at a third party web application or service, according to certain embodiments.

FIG. 2 is high-level flow chart that illustrates management of the user's data at a third party web application or service, according to certain embodiments. At block 202 in FIG. 2, the user uses the unified ID system to connect (link) with a third party web application or service through the user's unified ID account. At block 204, the user decides to sever the connection or link between the unified ID system and the target third party web application or service using the user's unified ID account. At block 206, the unified ID system notifies the target third party web application or service that the user has decided to sever the connection or link between the unified ID system and the target third party web application. At block 208, upon receiving the notice from the unified ID system that that the user has decided to sever the connection or link, the target third party web application or service removes all information that it has on the user.

According to certain embodiments, a user can conveniently use the unified ID system to interact with various websites and web applications to aid in filling out registration information with the user's personal information, for example. Thus, in addition to having control over the user's data, the user has the benefit of saving time by using the unified ID system. According to certain embodiments, the unified ID system enables the user to create a set of profiles. The user may wish to set up various profiles, each of which can be used for a different purpose. For example, the user may set up one profile with personal information for day to day use and another profile with professional/career related information, such as corporate contact information, etc., for use in professional networks and professional web applications. Once the profiles are created, then the user can select the desired profile for use/interaction with a target website or web application.

Figure 3:
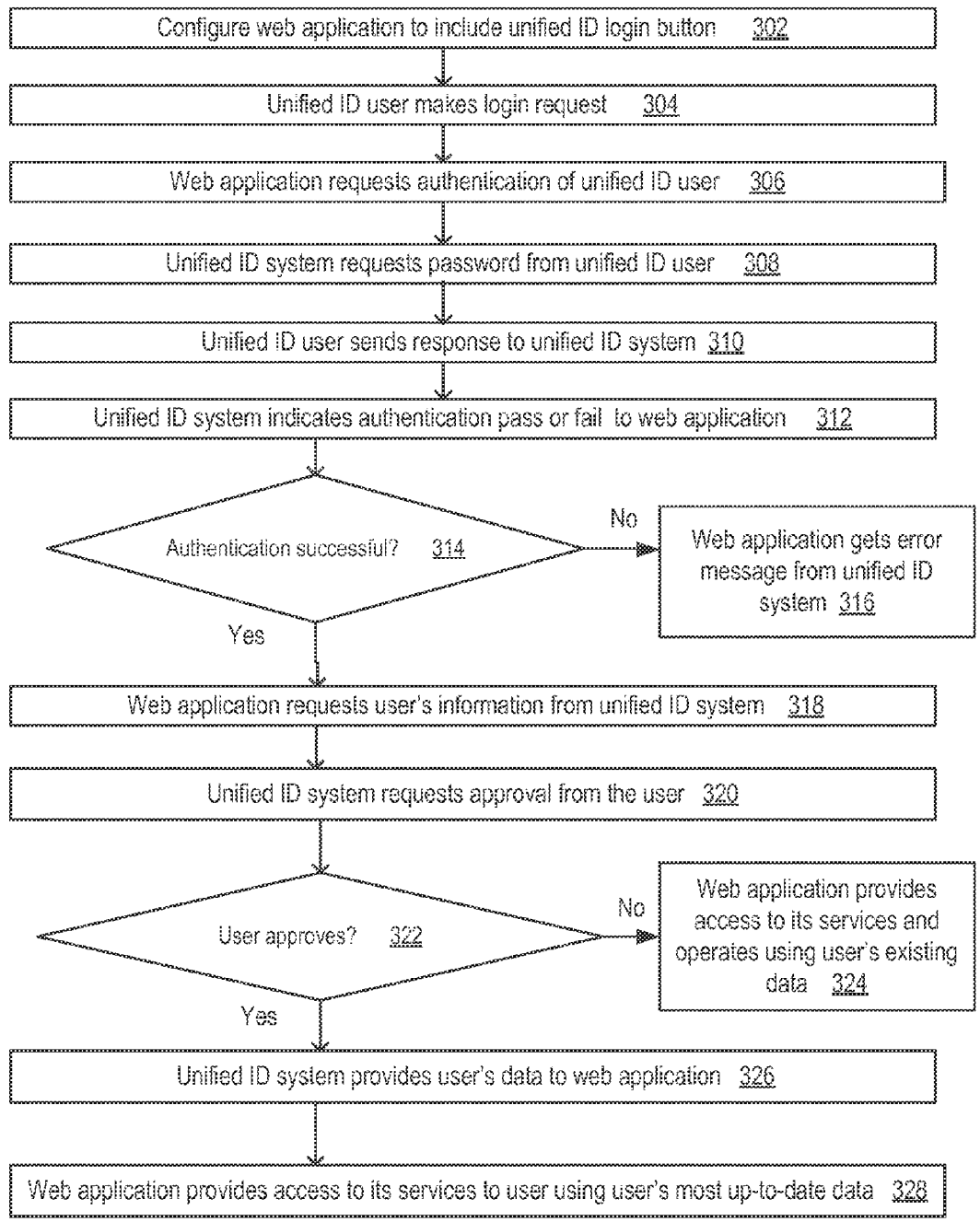
FIG. 3 is a high-level flow chart that illustrates the use of the unified ID system for user authentication.

According to certain embodiments, third party web applications and services can benefit by incorporating the use of the unified ID system not only in their basic registration and logon processes but also in their user authentication processes. FIG. 3 is a high-level flow chart that illustrates the use of the unified ID system for user authentication. At block 302 of FIG. 3, a respective web application is configured to include a unified ID login button. At block 304, the unified ID user makes a login request to the web application. At block 306, the web application requests authentication of the unified ID user. At block 308, the unified ID system requests the password form the unified ID user. At block 310, the unified ID user sends her response to the unified ID system. At block 312, the unified ID system indicates whether the authentication passed or failed to the web application. At block 314, if the user authentication is not successful, then at block 316, the web application receives an error message from the unified ID system. If the user authentication is successful, then at block 318, the web application requests the user's information from the unified ID system. At block 320, the unified ID system requests approval from the user. At block 322 if the user does not give approval, then at block 324, the web application provides access to its services and operates using the user's existing data. If the user gives approval, then at block 326, the unified ID system provides the up-to-date user's data to the web application. At block 328, the web application provides access to its services and operates using the user's most up-to-date data.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

I claim:

1. A method comprising:

receiving, by at least one processor, a unified ID and a unified password to access a unified identification account associated with a user, the unified identification account including user data for at least one user profile of the user, the unified identification account being linked to one or more third party accounts, each of the linked third party accounts including at least a portion of the user data included in the unified identification account;

updating the user data for the at least one user profile included in the unified identification account;

identifying at least one linked third party account of the one or more linked third party accounts that includes user data that is inconsistent with the user data updated in the unified identification account;

enabling the user to select the at least one linked third party account and to select at least some of the user data updated in the unified identification account to cause the at least one processor to propagate the selected at least some of the user data updated in the unified identification account to the selected at least one linked third party account of the one or more linked third party accounts; and in response to selection of the at least one linked third party account and to selection of the at least some of the user data updated in the unified identification account, propagating, using the at least one processor, the selected at least some of the user data updated in the unified identification account the selected at least one linked third party account of the one or more linked third party accounts.

2. The method of claim 1, further including receiving a request for authentication of the user from a particular one of the one or more linked third party accounts, the request for authentication including a request for access to the particular one of the one or more linked third party accounts.

3. The method of claim 1, further including requesting approval from the user before sending at least some of the user data to a particular one of the one or more linked third party accounts.

4. The method of claim 1, further including receiving an instruction to sever a link between a particular one of the one or more linked third party accounts and the unified identification account; and in response to the instruction to sever, informing the particular one of the one or more linked third party accounts of the instruction to sever.

5. The method of claim 4, further including removing at least a subset of the user data from the particular one of the one or more linked third party accounts in response to the instruction to sever.

6. The method of claim 1, wherein the unified identification account further includes a plurality of different user profiles for the user and wherein each linked third party account is associated with a particular one of the plurality of different user profiles.

7. The method of claim 1, further including confirming accuracy of any user data updates with the user when the user data updates occur in any linked third party account of the one or more linked third party accounts.

8. The method of claim 1, further including checking for inconsistencies in user data associated with the user across the one or more linked third party accounts; and notifying the user of the inconsistencies, if any.

9. A non-transitory computer readable storage medium storing program code for causing at least one processor to perform the steps of:

receiving, by at least one processor, a unified ID and a unified password to access a unified identification account associated with a user, the unified identification account including user data for at least one user profile of the user, the unified identification account being linked to one or more third party accounts, each of the linked third party accounts including at least a portion of the user data included in the unified identification account;

updating the user data for the at least one user profile included in the unified identification account;

identifying at least one linked third party account of the one or more linked third party accounts that includes user data that is inconsistent with the user data updated in the unified identification account;

enabling the user to select the at least one linked third party account and to select at least some of the user data updated in the unified identification account to cause the at least one processor to propagate the selected at least some of the user data updated in the unified identification account to the selected at least one linked third party account of the one or more linked third party accounts; and in response to selection of the at least one linked third party account and to selection of the at least some of the user data updated in the unified identification account, propagating, using the at least one processor, the selected at least some of the user data updated in the unified identification account to the selected at least one linked third party account of the one or more linked third party accounts.

10. A system comprising:

memory;

at least one processor configured to receive a unified ID and a unified password to access a unified identification account associated with a user, the unified identification account including user data for at least one user profile of the user, the unified identification account being linked to one or more third party accounts, each of the linked third party accounts including at least a portion of the user data included in the unified identification account;

update the user data for the at least one user profile included in the unified identification account;

identify at least one linked third party account of the one or more linked third party accounts that includes user data that is inconsistent with the user data updated in the unified identification account;

enable the user to select the at least one linked third party account and to select at least some of the user data updated in the unified identification account to cause propagation of the selected at least some of the user data updated in the unified identification account to the selected at least one linked third party account of the one or more linked third party accounts; and in response to selection of the at least one linked third party account and to selection of the at least some of the user data updated in the unified identification account, propagate the selected at least some of the user data updated in the unified identification account to the selected at least one linked third party account of the one or more linked third party accounts.

* * * * *

UNITED STATES PATENT AND TRADEMARK OFFICE
CERTIFICATE OF CORRECTION

PATENT NO.       : 9,529,930 B2  
APPLICATION NO.  : 14/300065  
DATED            : December 27, 2016  
INVENTOR(S)      : Maxym Polyakov Page 1 of 1

It is certified that error appears in the above-identified patent and that said Letters Patent is hereby corrected as shown below:

In the Claims

Claim 1, Column 5, Lines 9-10:
"the selected at least one linked third party account" should read -- to the selected at least one linked third party account --

Signed and Sealed this
Fourth Day of April, 2017

Michelle K. Lee
*Director of the United States Patent and Trademark Office*